(12) United States Patent
Amend et al.

(10) Patent No.: US 7,619,387 B2
(45) Date of Patent: Nov. 17, 2009

(54) BATTERY PACK ATTACHMENT ARRANGEMENT

(75) Inventors: Ryan Amend, Fanwood, NJ (US); Warren Seith, Bethlehem, PA (US)

(73) Assignee: Ingersoll-Rand Company, Montvale, NJ (US)

( * ) Notice: Subject to any disclaimer, the term of this patent is extended or adjusted under 35 U.S.C. 154(b) by 324 days.

(21) Appl. No.: 11/429,860

(22) Filed: May 8, 2006

(65) Prior Publication Data

US 2007/0257638 A1 Nov. 8, 2007

(51) Int. Cl.
*H02J 7/14* (2006.01)

(52) U.S. Cl. ............... 320/107; 320/114; 173/170; 173/192; 439/352; 439/500

(58) Field of Classification Search .......... 320/107, 320/112–115; 173/170, 192, 217; 439/11, 439/155, 352, 500, 929
See application file for complete search history.

(56) References Cited

U.S. PATENT DOCUMENTS

| | | | |
|---|---|---|---|
| 2,469,857 A | 5/1949 | Allyn | |
| 3,757,194 A | 9/1973 | Weber et al. | |
| 4,032,806 A | 6/1977 | Seely | |
| 4,447,749 A | 5/1984 | Reeb, Jr. et al. | |
| 4,616,169 A | 10/1986 | Proffitt | |
| 4,709,974 A | 12/1987 | Hawkins | |
| 4,751,452 A * | 6/1988 | Kilmer et al. | 320/106 |
| 4,779,687 A | 10/1988 | Schreiber et al. | |
| 4,835,410 A | 5/1989 | Bhagwat et al. | |
| 4,871,629 A | 10/1989 | Bunyea | |
| 5,089,738 A | 2/1992 | Bergqvist et al. | |
| 5,213,913 A | 5/1993 | Anthony, III et al. | |
| 5,445,900 A | 8/1995 | Miller, Jr. et al. | |
| 5,553,675 A | 9/1996 | Pitzen et al. | |
| 5,671,815 A | 9/1997 | Kabatnik et al. | |
| 5,769,657 A | 6/1998 | Kondo et al. | |
| 5,792,573 A | 8/1998 | Pitzen et al. | |
| 5,800,940 A | 9/1998 | Bunyea et al. | |
| 5,902,080 A | 5/1999 | Kopras | |
| 6,104,162 A | 8/2000 | Sainsbury et al. | |
| 6,112,414 A | 9/2000 | Andis et al. | |
| 6,126,670 A | 10/2000 | Walker et al. | |
| 6,139,359 A | 10/2000 | Fuhreck et al. | |
| 6,161,293 A | 12/2000 | Watson | |
| 6,384,572 B1 | 5/2002 | Nishimura | |
| 6,675,912 B2 | 1/2004 | Carrier | |
| 6,729,415 B1 * | 5/2004 | Huang | 173/217 |

(Continued)

FOREIGN PATENT DOCUMENTS

DE 3742268 6/1989

(Continued)

*Primary Examiner*—Edward Tso
*Assistant Examiner*—Arun Williams
(74) *Attorney, Agent, or Firm*—RatnerPrestia

(57) ABSTRACT

A battery pack attachment arrangement comprising a tool having a housing defining a hollow area and an opening into the hollow area. A first support track is defined within the housing hollow area. A battery pack includes a main body and a stem portion extending from the main body. A first key extends radially from the battery pack stem portion. The first key is configured to be received axially through a first keyway and thereafter rotated along the first support track from a first portion to a second portion such that the first key supports the battery pack relative to the housing.

29 Claims, 11 Drawing Sheets

U.S. PATENT DOCUMENTS

| | | |
|---|---|---|
| 6,840,335 B1 | 1/2005 | Wu |
| 6,887,244 B1 | 5/2005 | Walker et al. |
| 6,889,439 B2 | 5/2005 | Koukal et al. |
| 7,121,362 B2 * | 10/2006 | Hsu et al. .................. 173/217 |
| 2005/0058890 A1 * | 3/2005 | Brazell et al. ................ 429/99 |
| 2006/0113100 A1 * | 6/2006 | Hsu et al. .................. 173/217 |
| 2006/0228936 A1 * | 10/2006 | Chen .......................... 439/500 |
| 2006/0267548 A1 | 11/2006 | Uehlein-Proctor et al. |
| 2007/0003825 A1 | 1/2007 | Touchton et al. |

FOREIGN PATENT DOCUMENTS

| | | |
|---|---|---|
| GB | 2424989 A | 4/2005 |
| JP | 01171783 | 7/1989 |

* cited by examiner

BATTERY PACK ATTACHMENT ARRANGEMENT

BACKGROUND OF THE INVENTION

The present invention relates to attachment arrangements for attaching battery packs to cordless electric devices. More particularly, the present invention relates to a twist lock attachment arrangement for a battery pack.

Battery packs for powering cordless electric devices, such as portable drills, impact wrenches and the like, are well known. It has been found convenient to have the battery packs releasably mounted in the cordless devices, such as in or connected to the handle portions thereof, with a quick release type of latching arrangement so that the battery packs can be easily removed for recharging.

Generally, two types of battery pack attachment arrangements have been utilized, namely, a "stem pack" design and a "slide pack" design. With reference to FIG. 1, an illustrative stem pack design is shown. The illustrative electric tool 10 includes a head 12, a tool holder 14, a motor (not shown), a hollow handle 16 and a switch 18. The hollow handle 16 depends from the head 12 and may be formed integrally therewith or as separate component attached thereto. In either construction, the handle 16 is generally formed as two halves 17A and 17B which are interconnected via screws or the like (not shown). An electric circuit and wiring (not shown) are housed in the hollow handle 16.

The battery pack 20 is configured to connect to the hollow handle 16 and provide power to the electric tool 10. The battery pack 20 has a top surface 22 with an extended portion 24 configured to be received in the hollow handle 16. The extended portion 24 typically houses on or more battery cells therein such that the battery pack 20 external portion can be made smaller and the hollow space within the handle 16 is utilized, rather than being a dead space. The upper end of the extended portion 24 has one or more contacts 26 configured to contact internal contacts (not shown) within the electric tool 10. Since the extended portion 24 extends into the hollow handle 16, the internal contacts can be provided within the hollow handle 16 spaced from the opening into the hollow handle 16, thereby protecting the internal contacts.

The attachment arrangement for the battery pack 20 includes one or more biased latches 28. Each latch 28 is configured to engage a shoulder or the like (not shown) within the hollow handle 16. To attach the battery pack 20 to the electric tool 10, the extended portion 24 of the battery pack 20 is linearly inserted into the hollow handle 16 until the latches 28 snap into engagement with the respective shoulders within the hollow handle 16. To remove the battery pack 20, a push button 30 is associated with each latch 28. Depression of the push button 30 disengages the latch 28 from the respective shoulder.

When the battery pack 20 is connected with the electric tool 10, the latches 28 are directly burdened with the whole weight of the battery pack 20. Over time, the continuous load on the latches 28 and respective shoulders causes the latches 28 to wear out and may also cause the handle halves 17A and 17B to spread apart, which results in the battery pack 20 being less securely connected. As a result, the battery pack 20 may have a less reliable electrical connection or may be subject to inadvertent disconnection from the tool 10. Additionally, even if the latches 28 have not worn, the battery pack 20 may still be subject to inadvertent disconnection if the push buttons 30 are inadvertently depressed.

Referring to FIGS. 2 and 3, an illustrative slide pack design is shown. The electric tool 10' again includes a hollow handle 16'. With the slide pack design, the internal contact 15 is provided adjacent to the end of the handle 16' to facilitate contact with the battery pack contact 26', as described hereinafter. As can be seen in FIG. 2, most of the hollow space within the hollow handle 16' is unused, dead space.

The attachment arrangement for the battery pack 20' includes rails 32 on opposed sides of the battery pack 20' which define opposed slots 34. The slots 34 are configured to receive rails 19 provided on opposed sides of the tool handle 16'. To attach the battery pack 20' to the tool 10', the battery pack 20' is slid transversely to the axis of the handle 16', as indicated by arrow A in FIG. 2, such that the rails 19 are received in the slots 34. A releasable snap latch 33 or the like is provided on the battery pack 20' to secure the battery pack 20' to the tool 10' and prevent axial movement thereof. The weight of the battery pack 20' is supported by the rails 19 and slots 34. The latch 33 is not burdened with the weight of the pack 20', but instead only needs to prevent axial movement. While this design is advantages with respect to weight support, the transverse sliding of the battery pack 20' relative to the tool handle 16' prevents extension of the battery pack 20' beyond the upper rail 32. As a result, the space within the hollow handle 16' is not utilized and the battery pack 20' must have a larger external configuration to house an equal number of battery cells as the stem design. Additionally, the battery pack contact 26' also must be provided within the confines of the battery pack 20', thereby requiring the tool internal contact 15 to be provided at an exposed position at the end of the handle 16'.

SUMMARY OF THE INVENTION

The present invention provides in at least one aspect a battery pack attachment arrangement comprising a tool having a housing defining a hollow area and an opening into the hollow area. A first support track is defined within the housing hollow area. The first support track has a ramped surface extending between a first portion adjacent a first axial keyway and having a thickness t1 and a second portion spaced from the axial keyway and having a thickness t2 which is thicker than the thickness t1. A battery pack includes a main body and a stem portion extending from the main body. A first key extends radially from the battery pack stem portion. The first key is configured to be received axially through the first keyway and thereafter rotated along the first support track from the first portion to the second portion such that the first key supports the battery pack relative to the housing.

The present invention provides in another aspect a battery pack attachment arrangement comprising a tool having a housing defining a hollow area and an opening into the hollow area. A battery pack includes a main body and a stem portion extending from the main body, the stem portion being configured to be received in the hollow area. The stem body has a stem diameter and the battery pack contacts define a maximum battery pack contact diameter which is less than the stem diameter. The housing supports a pair of tool contacts configured to align with the battery pack contacts, the tool contacts biased radially inward to define a tool contact minimum diameter which is less than the battery pack contact diameter.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
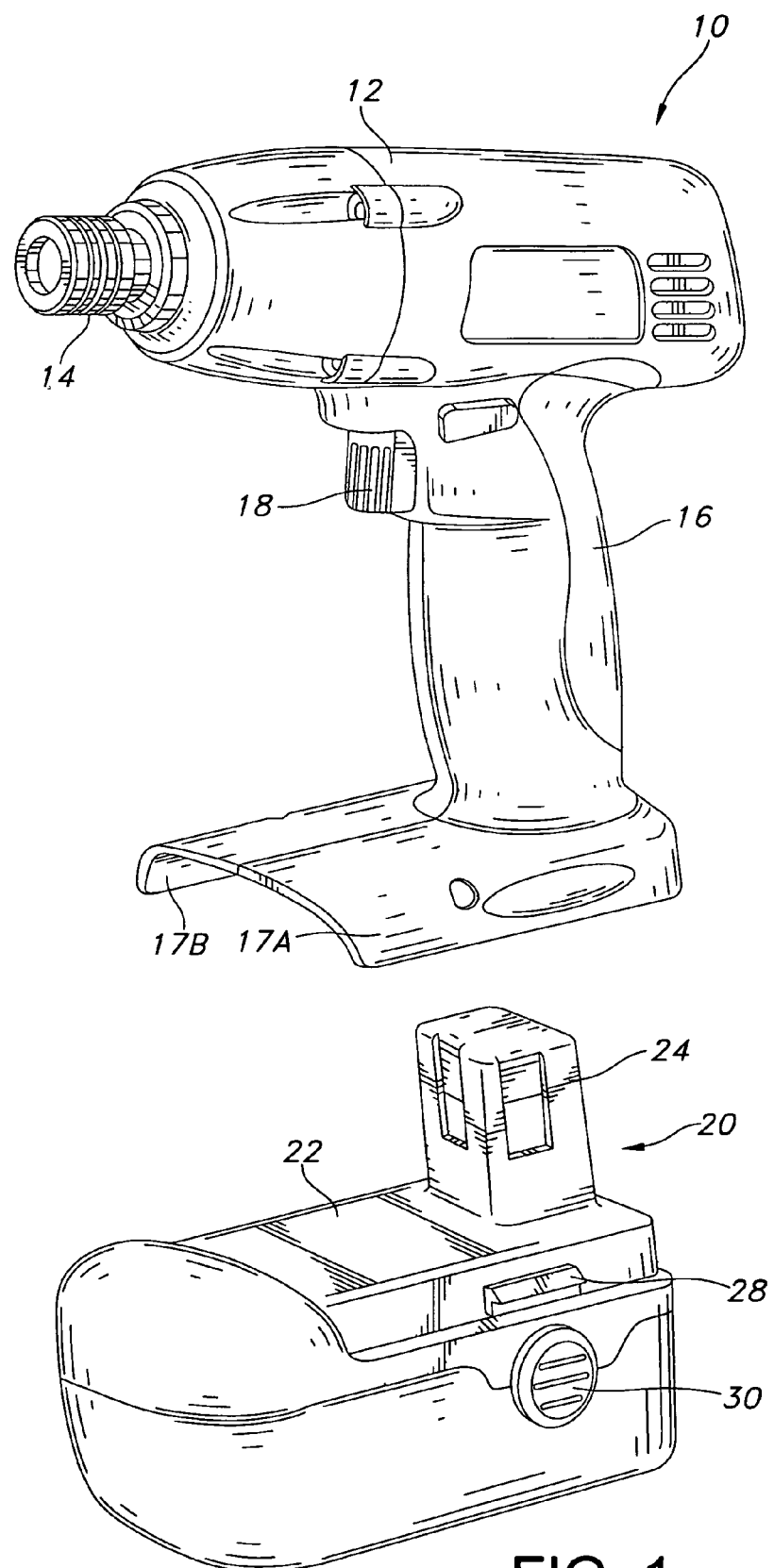
FIG. 1 is an isometric view of a prior art electric tool utilizing a stem design battery pack.
Figures 2, 3:
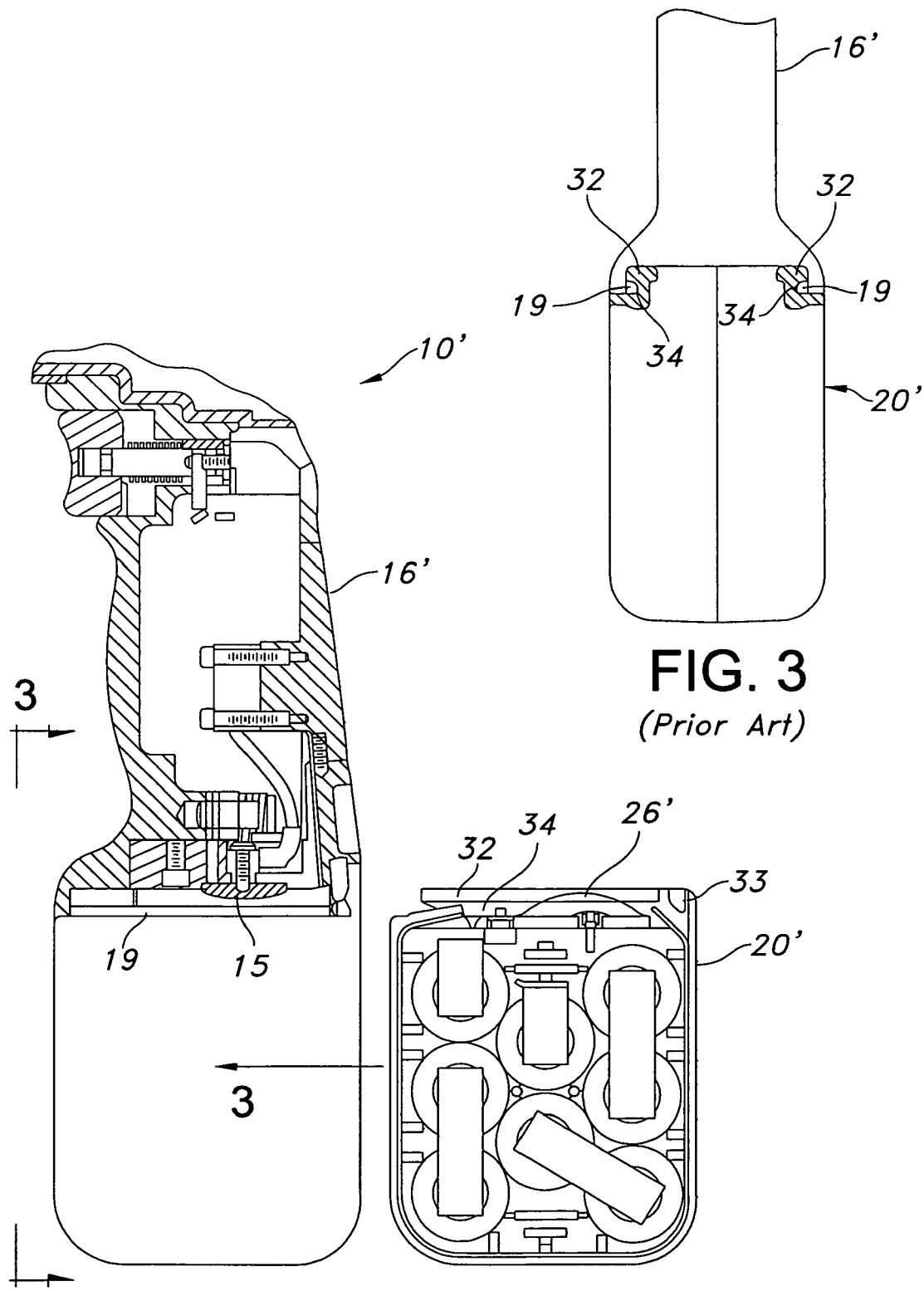
FIG. 2 is a partial, side cross-sectional view of a prior art electric tool utilizing a slide design battery pack.
FIG. 3 is a front elevation view, in partial section, along the line 3-3 in FIG. 2.
Figure 4:
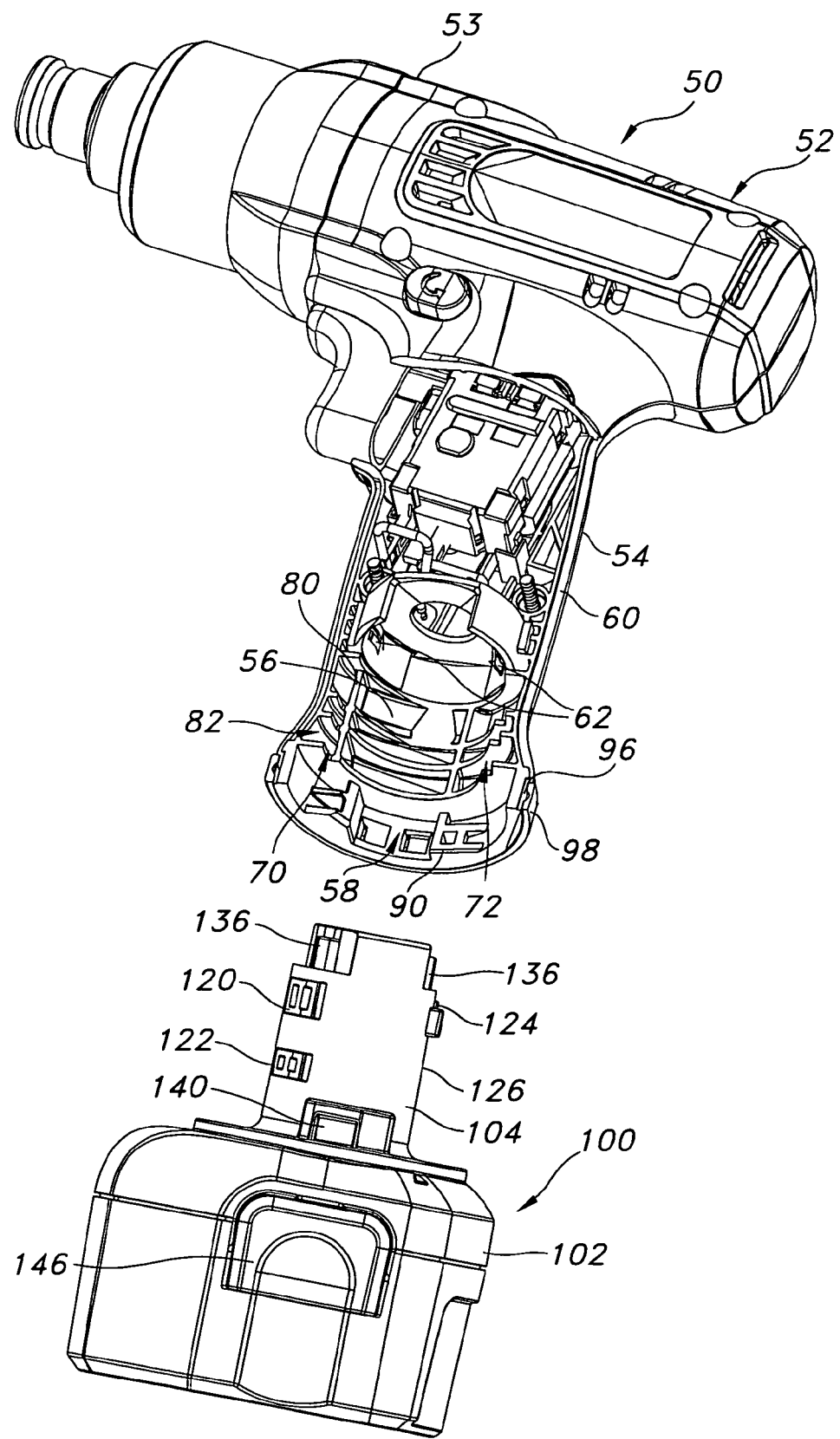
FIG. 4 is an isometric view of a battery pack and tool of a first embodiment of the present invention with the battery pack detached from the tool and the tool illustrated in partial section.

Referring to FIG. 4, an electric tool 50 and battery pack 100 illustrating an attachment arrangement that is a first embodiment of the present invention are shown. The illustrated electric tool 50 is an impact wrench, however, the present invention is not limited to such tool. For example, but not limited to, the electric tool 50 may be a drill, a reciprocating saw, a circular saw, a flash light, a grease gun, a ratchet or any other cordless powered tool. The illustrated electric tool 50 includes a tool body 52 defining a head portion 53 and a handle 54 depending therefrom. In the present embodiment, the handle 54 defines a generally hollow area 56 with an opening 58 into the hollow area 56. The opening 58 is configured to receive a stem portion 104 of the battery pack 100, as will be described hereinafter. While the present embodiment provides the hollow area 56 and the opening 58 within the handle 54 of the electric tool 50, the invention is not limited to such. The hollow area 56 may be provided at any desired location within the tool 50 with the opening 58 correspondingly positioned to open into the hollow area 56.

A tool contact ring 60 is positioned within the hollow area 56 and supports one or more circumferential contacts 62. The tool contact ring 60 may be formed as a separate component secured within the tool housing 52, may be formed integrally with the tool housing 52, or may be omitted, with the contacts 62 being secured directly to the tool housing 52. The contacts 62 are electrically interconnected with the electrical components of the tool 50. Such interconnection may take various forms which are known in the art. The interconnections are not illustrated in the drawings for clarity. The contacts 62 are configured to engage corresponding battery pack contacts 136, as will be described in more detail hereinafter.

The tool housing 52 of the present embodiment includes an internal rib structure which defines a plurality of axial keyways 70 and 72 and a plurality of longitudinal support tracks 80 and 82. The keyways 70 and 72 are configured to receive keys 120, 122, 124, 126 during axial insertion of the battery pack stem portion 104 through the opening 58 and into the hollow area 56. The longitudinal support track 80 is configured to support keys 120 and 124 while the longitudinal support track 82 is configured to support keys 122 and 126. The tool housing 52 also defines one or more latch stops 90 within the hollow area 56 configured to engage a releasable latch member 140. The support keys 122, 122, 124, 126, latch 140, keyways 70, 72, support tracks 80, 82 and latch stops 90 will be described in more detail hereinafter.

Figure 7:
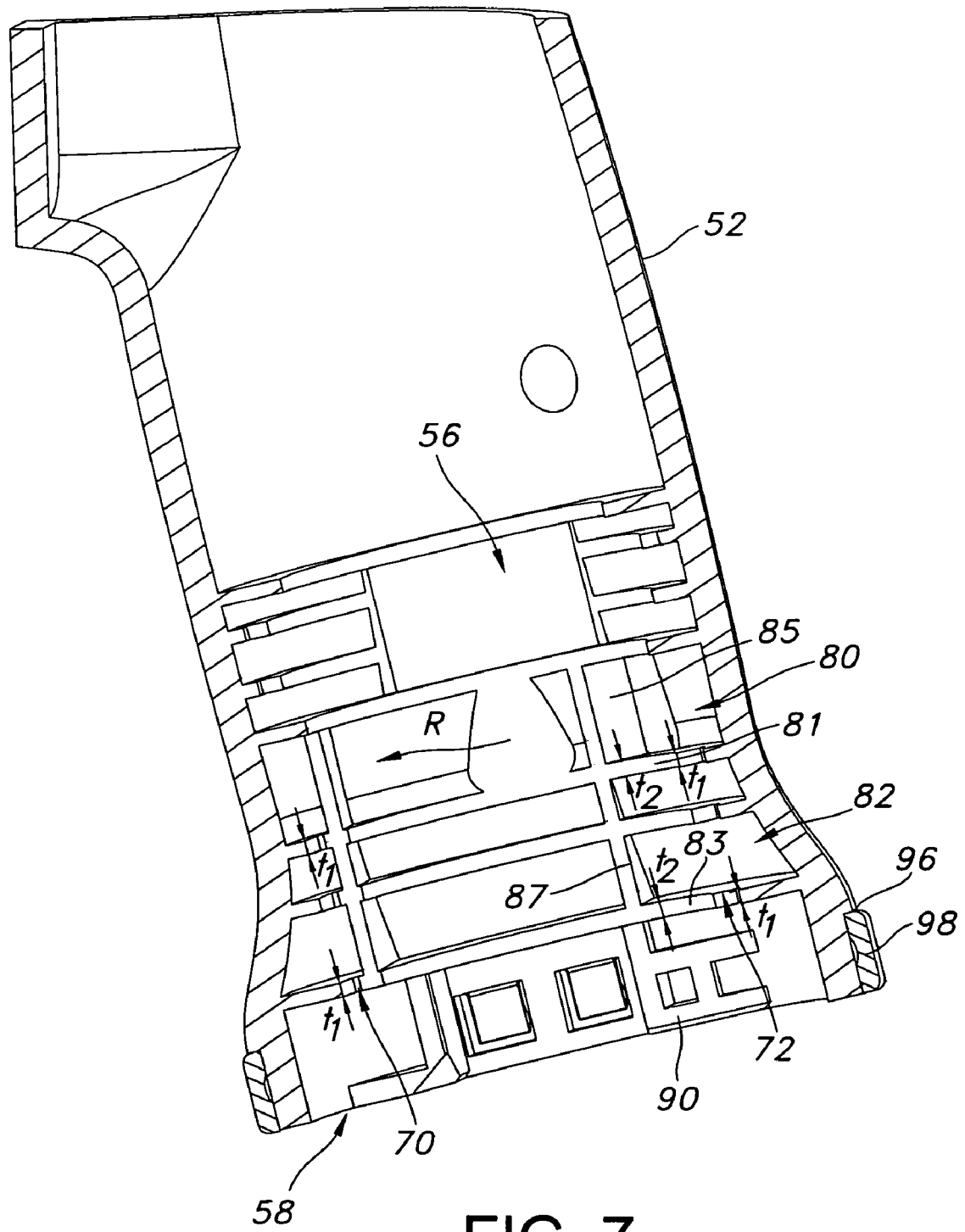
FIG. 7 is a cross-sectional view of the handle portion of an illustrative tool handle with the tool contact ring removed for clarity.
Figure 8:
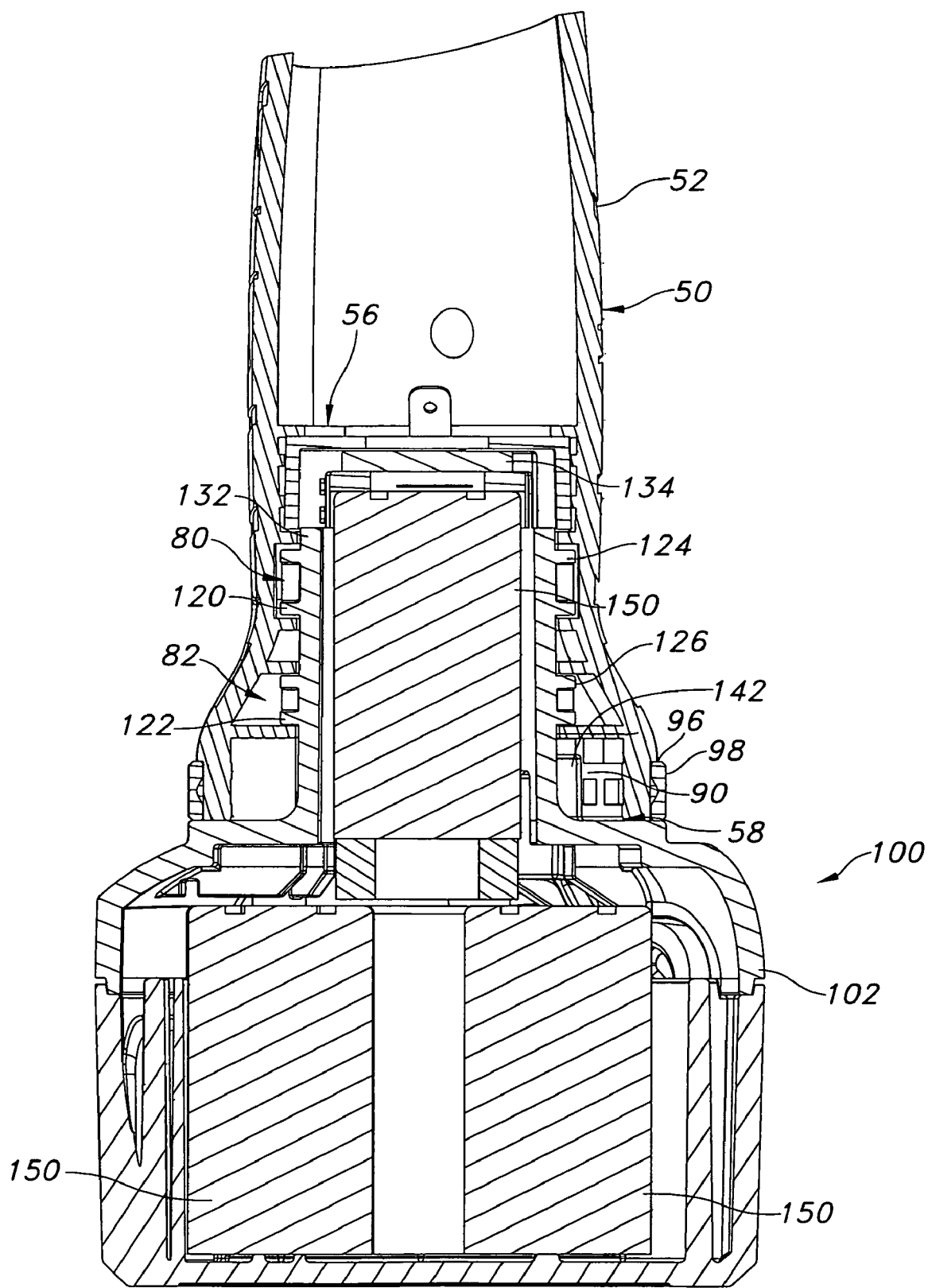
FIG. 8 is a cross-sectional view of the battery pack attached to the tool housing.

A continuous support ring 98 is preferably provided about the tool housing 52 adjacent to the opening 58. As illustrated in FIGS. 4, 7 and 8, the housing 52 may be provided with a circumferential channel 96 configured to receive the support ring 98. The support ring 98 minimizes separation of the tool housing 52 adjacent to the hollow area 56 and the opening 58, thereby maintaining a desired tolerance between the tool components and the battery pack components. The support ring 98 is preferably manufactured from metal, but may be manufactured from other substantially rigid materials. The support ring 98 is preferably formed as a continuous member and snap fit or otherwise positioned about the opening 58. Alternatively, the support ring 98 may be formed with open ends which are attached, for example, via welding, after the ring 98 is positioned about the opening 58. While the support ring 98 is illustrated in the preferred embodiments of the present invention, it is generally not required for the practice of the invention.

Figure 5:
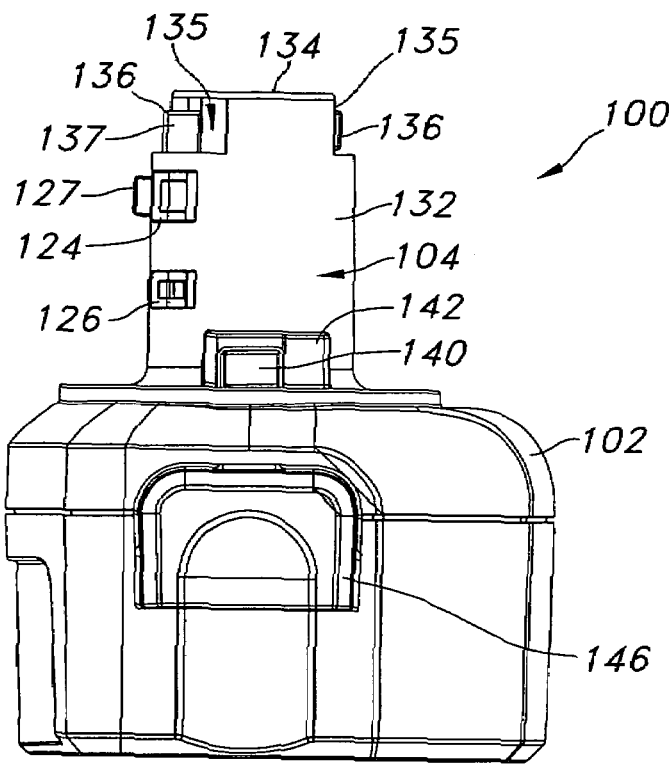
FIG. 5 is a side elevation view of the battery pack of the embodiment of FIG. 4.
Figure 6:
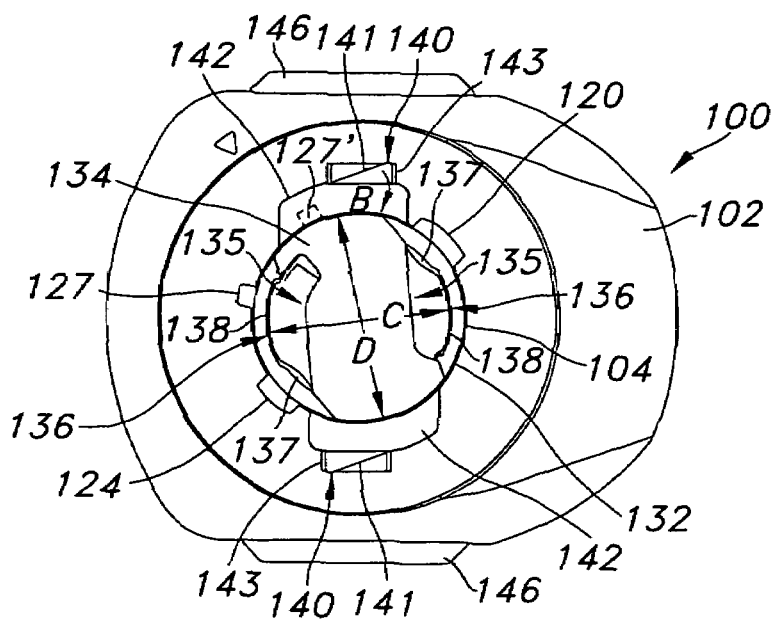
FIG. 6 is a top plan view of the battery pack of the embodiment of FIG. 4.

Referring to FIGS. 5 and 6, a battery pack 100 in accordance with a preferred embodiment of the present invention will be described. The battery pack 100 includes a main housing 102 with a stem portion 104 extending therefrom. The main housing 102 and the stem portion 104 house the battery cells 150 (see FIG. 8). The stem portion 104 preferably houses one or more of the battery cells 150.

In the illustrated embodiment, the stem portion 104 has a cylindrical body 132 extending from the main housing 102 to an end cap 134. A pair of opposed openings 135 are provided in the body 132 adjacent to the end cap 134. The number and position of the openings 135 may be varied. The openings 135 are configured to expose the battery contacts 136 which are electrically interconnected with the battery cells 150. As illustrated in FIG. 6, the stem portion body 132 has a diameter D while the contacts 136 extend a maximum diameter C which is less than the diameter D. As such, the contacts 136 remain within the envelope of, and are thereby protected by, the stem portion body 132. Each contact 136 preferably includes a radially tapered portion 137 extending to an arcuate portion 138. The tapered portions 137 are configured to first contact the tool contacts 62 during rotation of the battery pack 100 relative to the tool 50 such that the tool contacts 62 ride along the tapered portions 137 and into final engagement with the arcuate portion 138. The tapered portion 137 may be made from conductive material, or alternatively, may be a non-conductive material. Interaction between the battery contacts 136 and the tool contacts 62 will be described in more detail hereinafter with respect to FIGS. 12-15.

Referring to FIGS. 4-6, the battery pack 100 includes four support keys 120, 122, 124 and 126 extending radially outward from the stem portion body 132. While four support keys are illustrated, more or fewer keys may be utilized. In the preferred embodiment, keys 120 and 122 are circumferentially aligned and have substantially the same circumferential width such that during axial positioning of the stem portion 104 into the hollow area 56, both keys 120 and 122 may pass through the same axial keyway 70. Likewise, keys 124 and 126 are circumferentially aligned and have substantially the same circumferential width such that during axial positioning of the stem portion 104 into the hollow area 56, both keys 124 and 126 may pass through the same axial keyway 72. While this arrangement is preferred, the arrangement of the keys and the number of axial keyways may be varied.

As seen in FIG. 6, keys 120 and 122 preferably have a circumferential width that is distinct from the circumferential width of keys 124 and 126 such that the battery pack stem portion 104 may only be inserted into the hollow area 56 in one orientation, i.e. with keys 120 and 122 aligned with the correspondingly sized axial keyway 70 and the keys 124 and 126 aligned with the correspondingly sized axial keyway 72. Such limitation of the orientation ensures that the polarity between the contacts 136 and 62 is maintained. Other features may alternatively be used to ensure proper orientation of the battery pack 100 relative to the tool 50. For example, the opposed keys 120, 122 and 124, 126 may be offset by an angle other than 180° such that the configuration is asymmetric, and thereby, only positional in a single orientation.

Alternatively, or in addition to the above methods, an alignment key 127 may be provided along the stem portion 104. The alignment key 127 may be provided along a circumferential position which aligns with an alignment keyway 74 in the housing 52 (see FIG. 9A). As such, the battery pack 100 must be aligned in a proper position with the alignment key 127 aligned with the alignment keyway 74 in order to insert the stem portion 104 into the tool hollow area 56. With such a configuration, the support keys 120, 122, 124, 126, and thereby the corresponding axial keyways 70, 72, may be formed with the same circumferential width since the alignment key 74 ensures proper orientation.

In the illustrated embodiment, the support keys 120, 122 have a different circumferential width than the support keys 124, 126 and an alignment key 127 is provided. The inclusion of both features provides a voltage lockout feature in addition to the orientation feature. That is, the specific configuration and position of the support keys 120-126 and the alignment key 127 will represent a battery pack 100 having a particular voltage. The support keys 120-126 and alignment key 127 will only be receivable in tools 50 designed to utilize the particular voltage. For example, the configuration illustrated in solid lines in FIG. 6 may represent a battery pack 100 providing 24 volts while the configuration illustrated by alignment key 127', shown in phantom, may represent a battery pack 100 providing 18 volts. All tools 50 utilizing 24 volts would include an alignment keyway 74 that aligns with alignment key 127 while all tools 50 utilizing 18 volts would include an alignment keyway 74 that aligns with alignment key 127'. Since the configuration of the keys 120-126 and the alignment keyway 127 are distinct from the configuration of the keys 120-126 and the alignment keyway 127', the different voltage battery packs would not be capable of inadvertent use with the wrong tool.

Referring again to FIGS. 5 and 6, a pair of opposed latches 140 are provided on the stem portion 104. Each latch 140 is pivotally supported by a latch block 142. As indicated by the arrows B, each latch 140 is configured to pivot within the corresponding latch block 142 against a biasing member (not shown). Each latch 140 includes a sloped surface 141 and a stop surface 143. During rotation of the battery pack 100 relative to the tool housing 52, the sloped surface 141 contacts a respective housing stop 90 (see FIG. 9A) and causes the latch 140 to pivot into the respective latch block 142 (see FIG. 10A). Once the battery pack 100 has been rotated to the final position, the latch 140 has cleared the housing stop 90 and the biasing member urges the latch 140 to the original position wherein the latch stop surface 143 engages the respective housing stop surface 92 (see FIG. 11A) and prevents reverse rotation of the battery pack 100. To remove the battery pack 100, a release button 146 is associated with each latch 140. Depression of the release button 146 causes the latch 140 to pivot within the latch block 142, thereby allowing reverse rotation of the battery pack 100 to disconnect the pack from the tool 50.

Referring to FIGS. 5-8, support of the support keys 120-126 on the housing support tracks 80 and 82 will be described. As seen in FIG. 8, the opposed support keys 120 and 124 are axially aligned with one another such that both support keys 120 and 124 are axially aligned with support track 80 when the battery pack stem portion 104 is fully inserted into the housing hollow area 56. Similarly, the opposed support keys 122 and 126 are axially aligned with one another such that both support keys 122 and 126 are axially aligned with support track 82 when the battery pack stem portion 104 is fully inserted into the housing hollow area 56. While this configuration is preferred, other configurations with different corresponding track configurations may also be utilized.

Referring to FIG. 7, each support track 80 and 82 preferably includes one or more stop surfaces 85, 87. The stop surfaces 85, 87 are configured to contact a respective support key 120-126 and limit the rotation of the battery pack 100 relative to the tool housing 52. Each support track 80 and 82 also preferably includes a ramped support surface 81 and 83, respectively, for engagement with each support key 120-126. That is, each ramped support surface 81, 83 has a thickness $t_1$ adjacent the respective axial keyway 70, 72 that is thinner than the thickness $t_2$ of the surface 81, 83 adjacent the stop surface 85, 87. As such, as the battery pack 100 is rotated relative to the housing 52 as indicated by arrow R in FIG. 7, the support keys 120-126 ride up the ramped support surfaces 81, 83 and draw the battery pack 100 axially toward the housing 52. The ramped surfaces 81, 83 provide a mechanical advantage which allows a secure attachment between the battery pack 100 and the housing 52 without excessive force.

As shown in FIG. 8, the support keys 120-126 engage the support tracks 80 and 82 and bear substantially the total axial load of the battery pack 100. The latches 140 do not bear any axial load, but instead are only required to prevent rotation of the battery pack 100 relative to the housing 52.

Figure 9A:
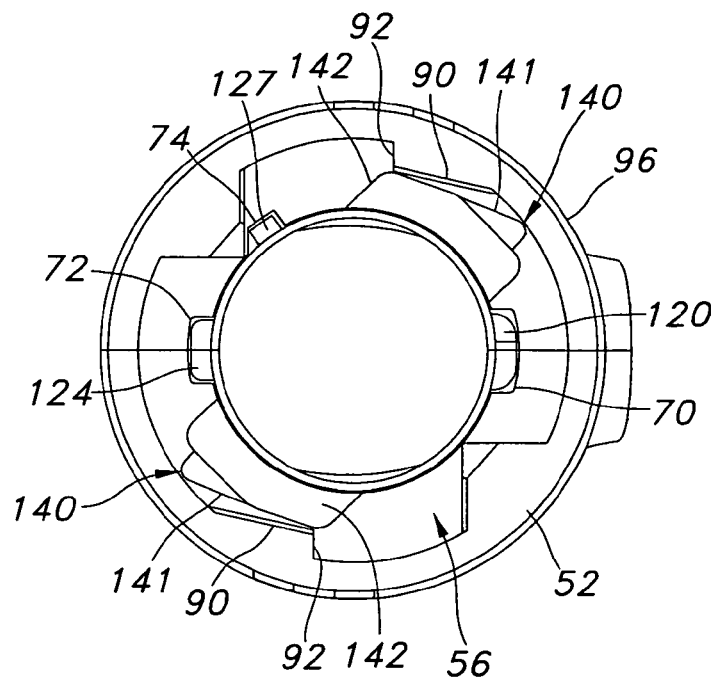
FIG. 9A is a bottom view of the tool housing of the present embodiment illustrating the relative position of the battery pack stem during insertion of the battery pack stem into the tool housing.
Figure 9B:
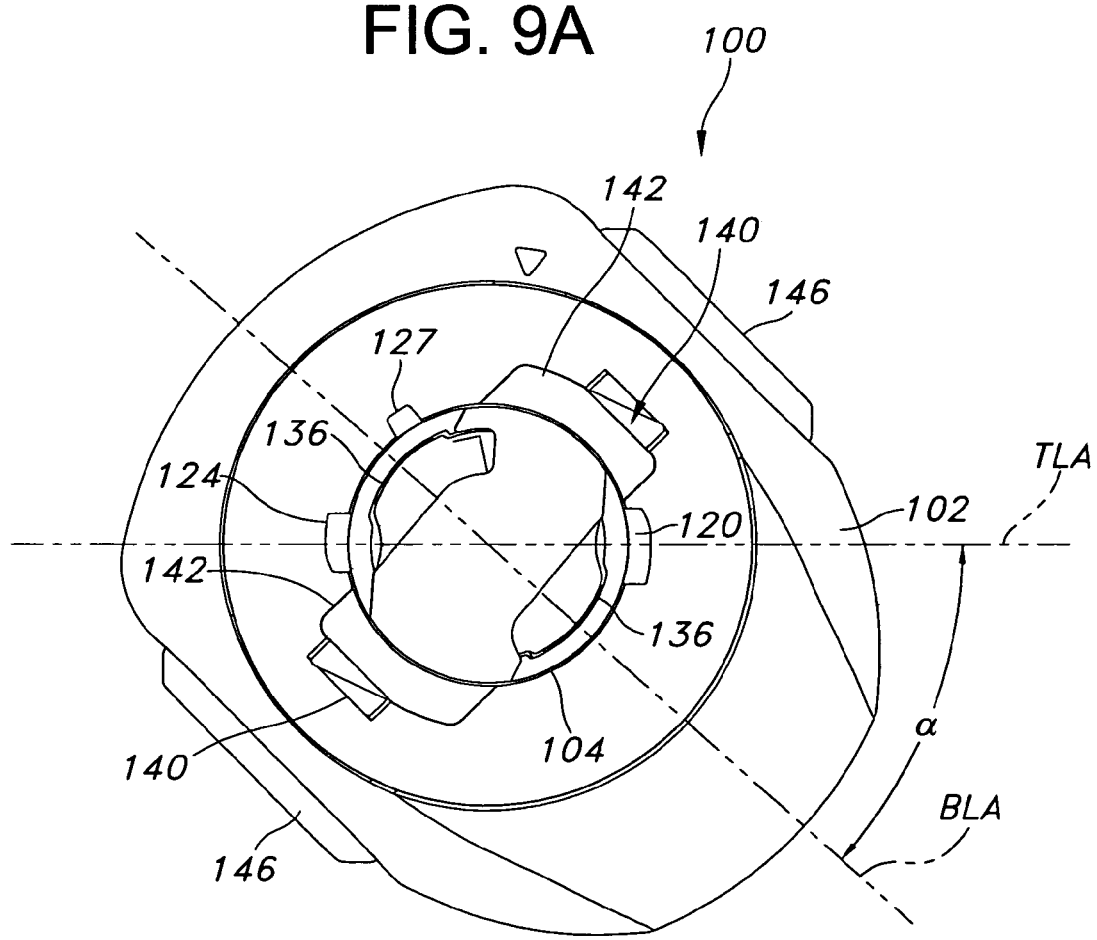
FIG. 9B is a top plan view of the battery pack of the present invention illustrating the orientation of the battery pack longitudinal axis relative to the tool longitudinal axis during insertion of the battery pack into the tool housing.

Having described the components of the preferred embodiments of the attachment arrangement of the present invention, attachment of a battery pack 100 relative to the housing 52 will be described with reference to FIGS. 9A-11B. Referring to FIG. 9A, the battery pack 100 is oriented with respect to the housing 52 such that the support keys 120 and 122 (not shown in FIG. 9A) are aligned with axial keyway 70, support keys 124 and 126 (not shown in FIG. 9A) are aligned with axial keyway 72, and the alignment key 127 is aligned with the alignment keyway 74. In this orientation, the battery pack stem portion 104 is moved axially into the hollow area 56 of the housing 52. The latch 140 and latch block 142 are receivable within the hollow area 56 adjacent the opening 58 (see FIG. 7). As shown in FIG. 9B, in this initial position, the battery pack 100 is preferably rotated relative to the tool such that the battery pack longitudinal axis BLA is at an angle α relative to the tool longitudinal axis TLA. In the preferred embodiment, the angle α is approximately 45°.

Figure 10A:
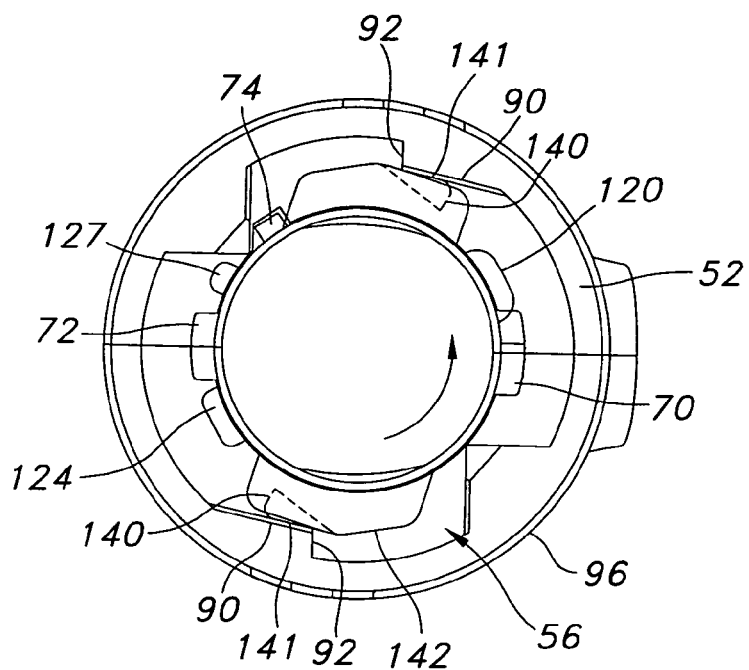
FIG. 10A is a bottom view of the tool housing similar to FIG. 9A and illustrating rotation of the battery pack relative to the tool housing during attachment of the battery pack.
Figure 10B:
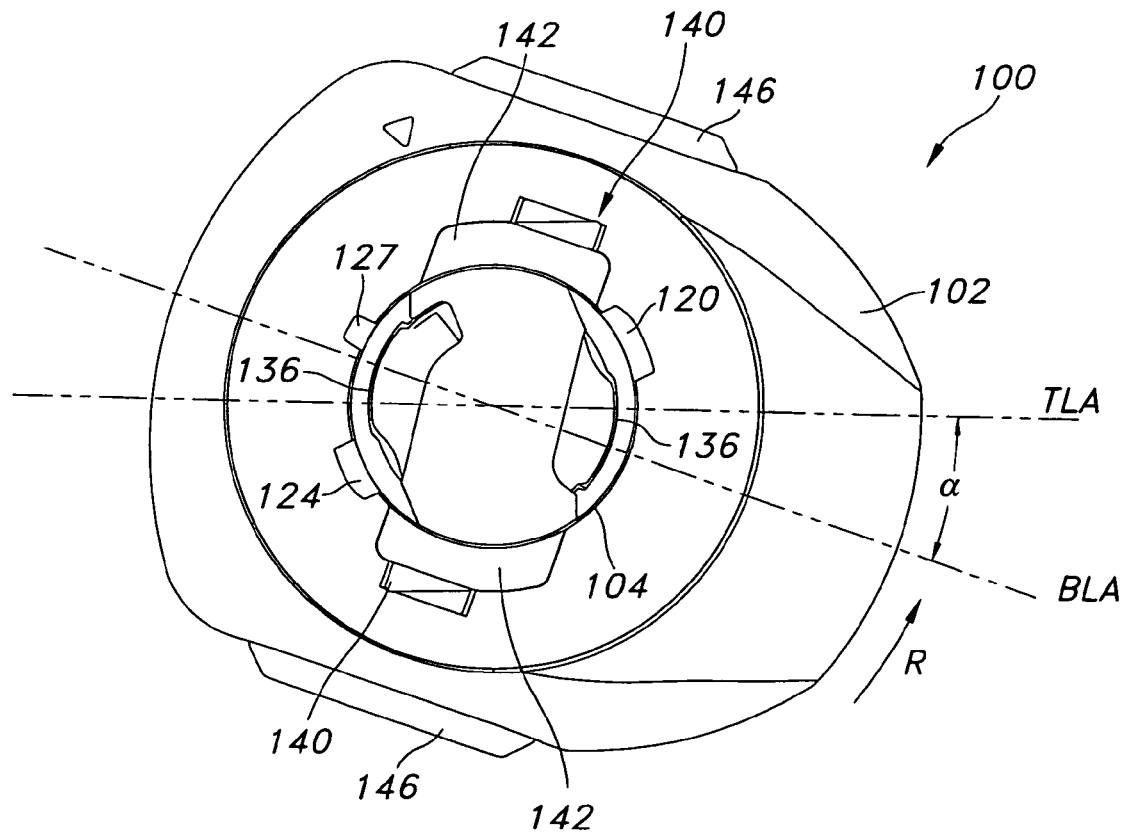
FIG. 10B is a top plan view of the battery pack similar to FIG. 9B and illustrating the orientation of the battery pack longitudinal axis relative to the tool longitudinal axis as the battery pack is rotated in the tool housing.

Referring to FIGS. 10A and 10B, the battery pack 100 is rotated relative to the housing 52 in the direction R such that the angle α between the battery pack longitudinal axis BLA and the tool longitudinal axis TLA is reduced. As the battery pack 100 is rotated, the support keys 120-126 rotate away from the respective axial keyways 70 and 72 and begin to ride up the ramped support surfaces 81 and 83 (see FIG. 7). The latch sloped surface 141 contacts the stop 90 and pivots into the respective latch block 142 against the force of the biasing member.

Figure 11A:
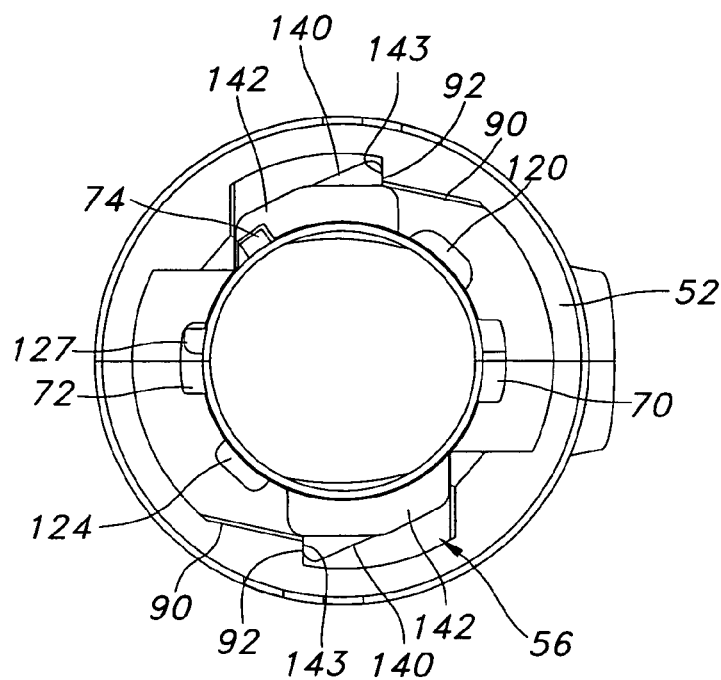
FIG. 11A is a bottom view of the tool housing similar to FIG. 9A and illustrating the battery pack relative to the tool housing after attachment of the battery pack is completed.
Figure 11B:
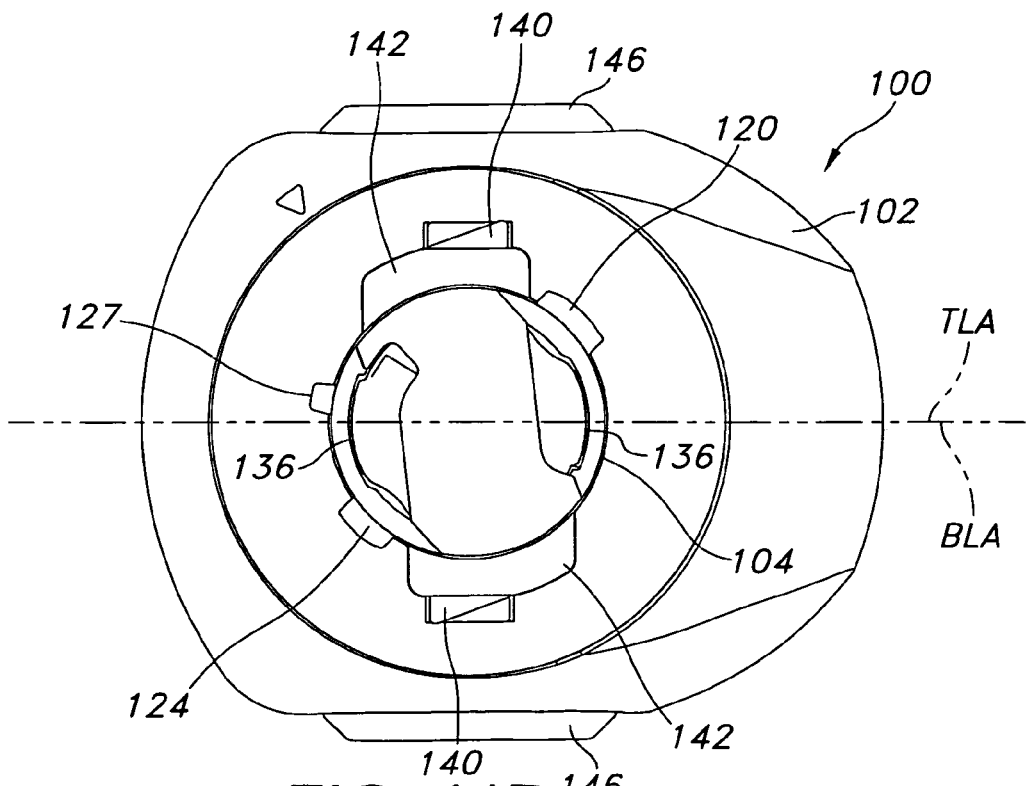
FIG. 11B is a top plan view of the battery pack similar to FIG. 9B and illustrating the orientation of the battery pack longitudinal axis relative to the tool longitudinal axis after attachment of the battery pack is completed.
Figure 12:
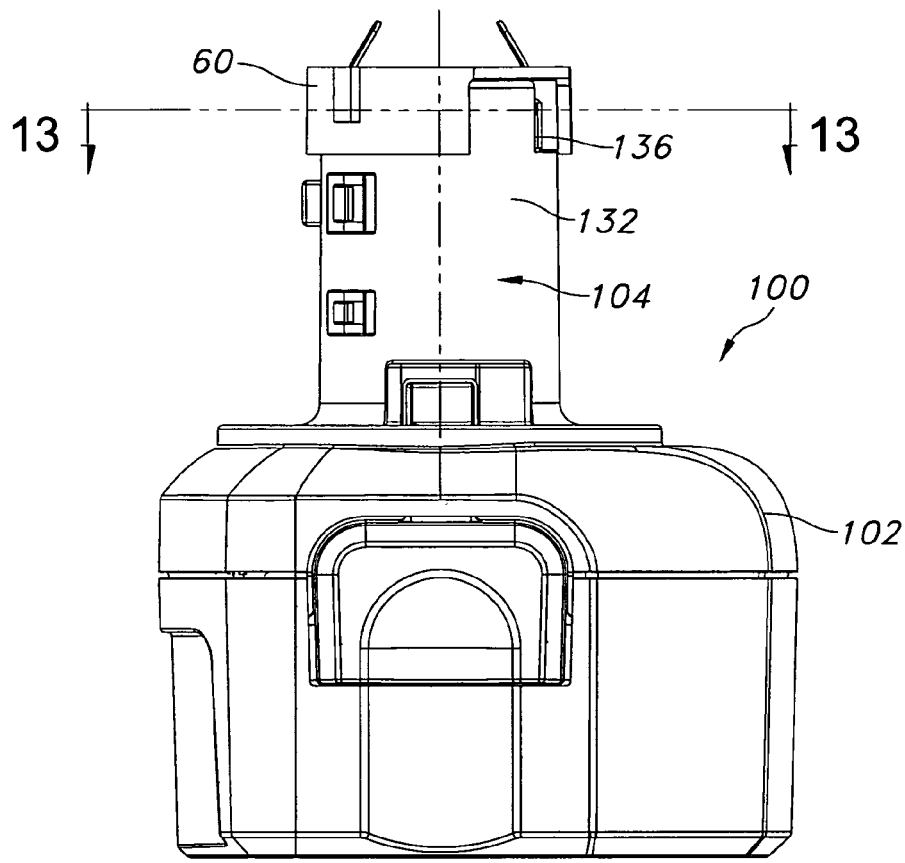
FIG. 12 is a side elevation view a battery pack of the present invention illustrating the relative position of the tool contact ring prior to rotation of the battery pack relative to the handle.

Referring to FIGS. 11A and 11B, once the battery pack 100 is rotated to the final position wherein the battery pack longitudinal axis BLA is substantially aligned with the tool longitudinal axis TLA, the latches 140 have cleared the stops 90 and are biased to their original positions wherein the latch stop surfaces 143 abut the respective housing stop surfaces 92. The latches 140 prevent reverse rotation of the battery pack 100 relative to the housing 52. The support stops 120-126 are supported on the support tracks 80, 82 (see FIG. 8) and bear substantially the full axial load of the battery pack 100. To remove the battery pack 100, the release buttons 146 are depressed such that the latches 140 pivot into the latch blocks 142, thereby permitting reverse rotation of the battery pack 100 relative to the housing 52.

Figure 13:
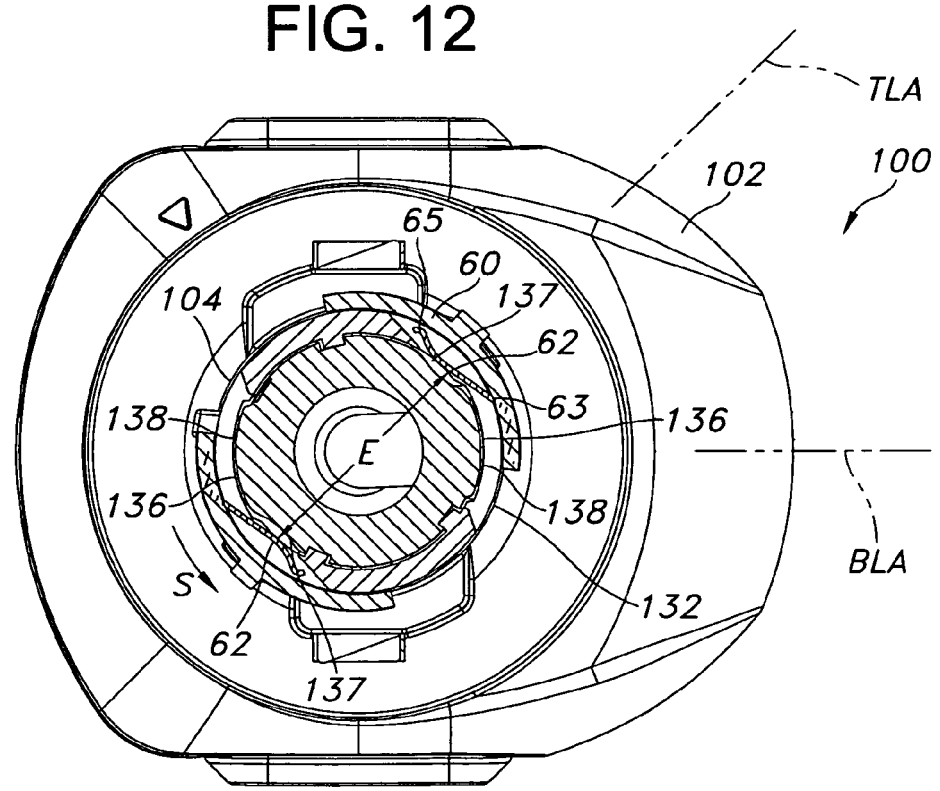
FIG. 13 is a cross-sectional view along the lines 13-13 in FIG. 12.

Referring to FIGS. 12-15, a preferred electrical contact arrangement will be described. In these figures, the tool contact ring 60 is illustrated relative to the battery pack stem portion 104. The contact ring 60 will generally be secured within the tool housing 52, but is illustrated herein as a separate component for simplification of the description. As shown in FIG. 13, a pair of opposed tool contacts 62 extend inwardly from the contact ring 60. As described above, the tool contacts 62 may alternatively be directly connected with the tool housing 52. Each contact 62 extends from a secured end 63 radially inward toward a free end 65. Each contact 62 extends in a circumferential direction S. As illustrated in FIG. 13, the free end 65 does not have to be the radially inner most portion of the contact 62. The opposed contacts 62 define a minimum internal diameter E between their radially inner most portions which is less than the maximum battery contact diameter C (see FIG. 6). In the initial position illustrated in FIGS. 12 and 13, the contacts 62 align with the battery contact sloped portions 137, thereby accommodating this smaller diameter E.

Figure 14:
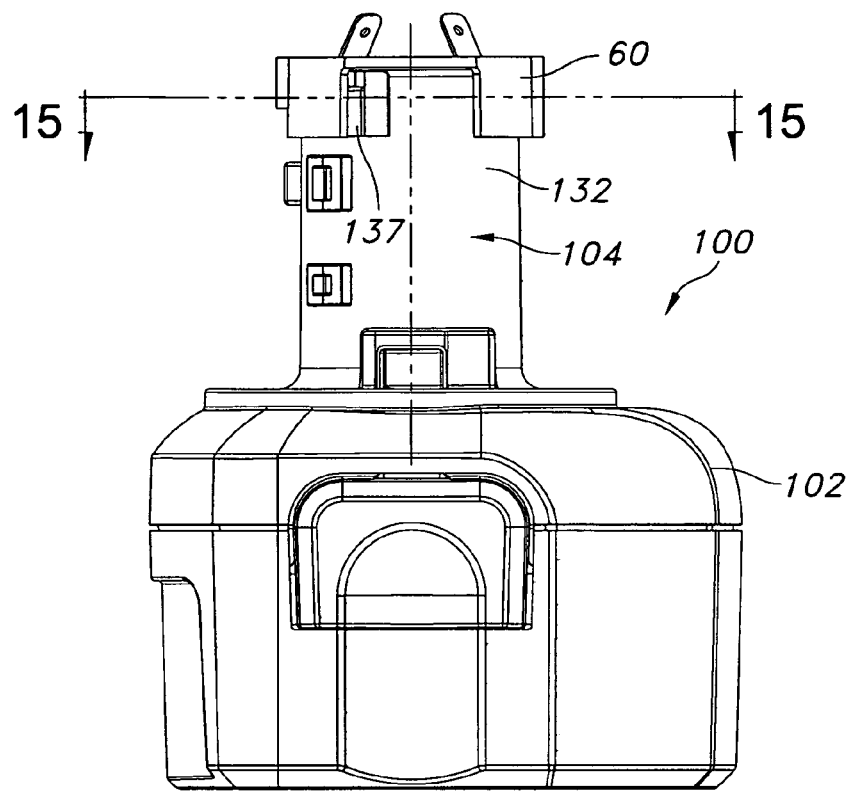
FIG. 14 is a side elevation view similar to FIG. 12 and illustrating the relative position of the tool contact ring after attachment of the battery pack is completed.
Figure 15:
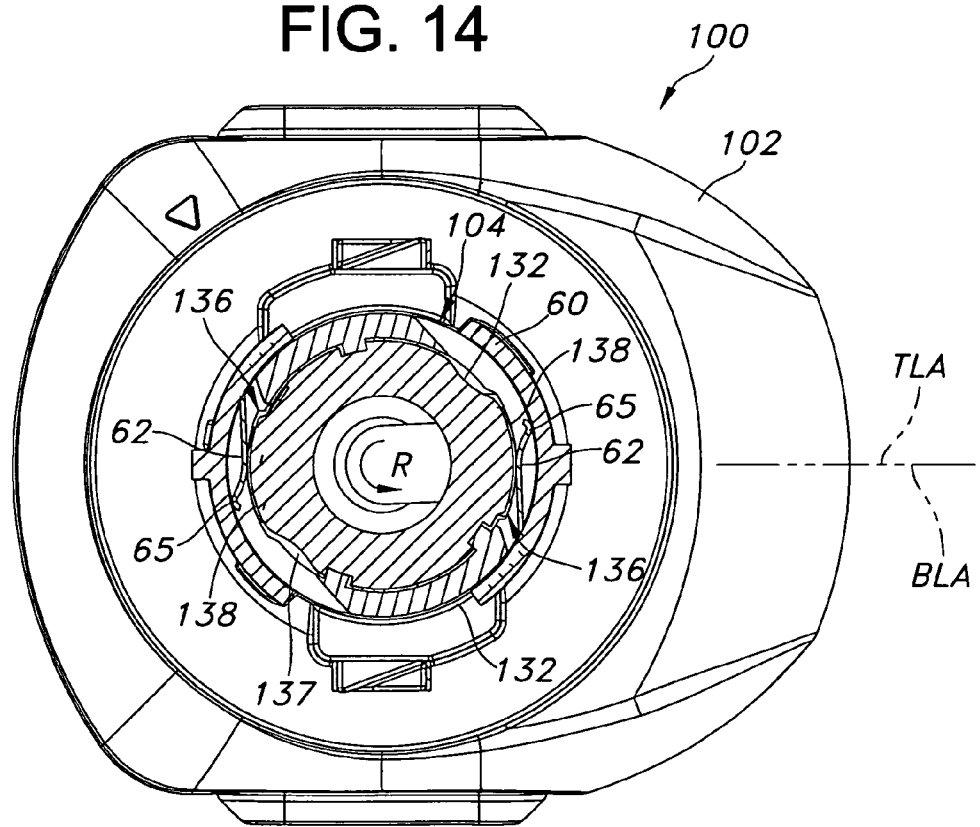
FIG. 15 is a cross-sectional view along the lines 15-15 in FIG. 14.

Referring to FIGS. 14 and 15, the battery pack 100 is rotated in the direction R to a final position wherein the battery pack longitudinal axis BLA is substantially aligned with the tool longitudinal axis TLA. Preferably, the direction of rotation R is the same as the extending direction S of the contacts 62 such that as the battery pack 100 is rotated, the contacts 62 ride up the slope portions 137 and into contact with the battery pack contact arcuate portions 138. The tool contact free ends 65 are free to flex outwardly during engagement. Since the tool contacts 62 are biased toward a minimum diameter E which is less than the battery contact diameter C, the tool contacts 62 are biased into strong electrical contact with the battery contacts 136. The rotative engagement of the contacts 62 and 136 additionally provides improved wiping of the contacts during engagement.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A battery pack attachment arrangement comprising:
   a tool having a housing defining a hollow area and an opening into the hollow area;
   a first support track defined within the housing hollow area, the first support track having a ramped surface extending between a first portion adjacent a first axial keyway and having a thickness t1 and a second portion spaced from the axial keyway and having a thickness t2 which is thicker than the thickness t1;
   a battery pack including a main body and a stem portion extending from the main body; and
   a first key extending radially from the battery pack stem portion, wherein the first key is configured to be received axially through the first keyway and thereafter rotated along the first support track from the first portion to the second portion such that the first key supports the battery pack relative to the housing.

2. The battery pack attachment arrangement of claim 1 wherein the tool includes a head portion and a handle depending therefrom and wherein the housing hollow area is defined within the handle.

3. The battery pack attachment arrangement of claim 1 further comprising a continuous support ring positioned about the tool housing adjacent to the opening.

4. The battery pack attachment arrangement of claim 3 wherein the housing includes a channel configured to receive the support ring.

5. The battery pack attachment arrangement of claim 3 wherein the support ring is formed into a continuous member prior to positioning about the tool housing.

6. The battery pack attachment arrangement of claim 3 wherein the support ring is formed with open ends which are attached after the support ring is positioned about the tool housing.

7. The battery pack attachment arrangement of claim 1 wherein the battery pack main body and the battery pack stem portion each house at least one battery cell.

8. The battery pack attachment arrangement of claim 1 wherein the battery pack stem portion includes a stem body defining a pair of contact openings aligned with associated battery pack contacts.

9. The battery pack attachment arrangement of claim 8 wherein the stem body has a stem diameter and the battery pack contacts define a maximum battery pack contact diameter which is less than the stem diameter.

10. The battery pack attachment arrangement of claim 9 wherein the housing supports a pair of tool contacts configured to align with the battery pack contacts, the tool contacts biased radially inward to define a tool contact minimum diameter which is less than the battery pack contact diameter.

11. The battery pack attachment arrangement of claim 8 wherein the housing supports a pair of tool contacts configured to align with the battery pack contacts, each tool contact including a fixed end and a free end.

12. The battery pack attachment arrangement of claim 11 wherein each tool contact extends from the fixed end to the free end in a first circumferential direction and the battery pack is rotated in the first circumferential direction as the first key is moved from the first portion to the second portion.

13. The battery pack attachment arrangement of claim 12 wherein each battery pack contact includes a sloped portion followed in the first circumferential direction by an arcuate portion such that a respective tool contact moves radially outward along the sloped portion as the battery pack is rotated in the first circumferential direction.

14. The battery pack attachment arrangement of claim 13 wherein the sloped portions are made from a non-conductive material.

15. The battery pack attachment arrangement of claim 1 wherein a second key extends radially from the battery pack stem portion at a position circumferentially spaced from the first key.

16. The battery pack attachment arrangement of claim 15 wherein the second key is configured to be aligned with a second axial keyway.

17. The battery pack attachment arrangement of claim 16 wherein the first and second keys are supported on the first support track.

18. The battery pack attachment arrangement of claim 17 wherein the first support track has a second ramped surface extending between a third portion adjacent the second axial keyway and having a thickness t1 and a fourth portion spaced from the second axial keyway and having a thickness t2 which is thicker than the thickness t1.

19. The battery pack attachment arrangement of claim 16 wherein the first key has a first circumferential width and the second key has a second circumferential width distinct from the first circumferential width such that the battery pack must be oriented in a given orientation to facilitate passage of the first and second keys into the respective axial keyways.

20. The battery pack attachment arrangement of claim 16 wherein the first and second keys are circumferentially asymmetrically positioned about the stem such that the battery pack must be oriented in a given orientation to facilitate passage of the first and second keys into the respective axial keyways.

21. The battery pack attachment arrangement of claim 16 wherein the configuration of the first and second keys and the first and second axial keyways corresponds to a particular battery voltage such the battery pack can only be attached to tools utilizing the particular voltage.

22. The battery pack attachment arrangement of claim 15 wherein an alignment key extends radially from the battery pack stem portion at a position circumferentially between the first and second keys, the alignment key configured to be received axially in an alignment keyway.

23. The battery pack attachment arrangement of claim 22 wherein the configuration of the first and second keys, the alignment key, the first and second axial keyways and the alignment keyway corresponds to a particular battery voltage such the battery pack can only be attached to tools utilizing the particular voltage.

24. The battery pack attachment arrangement of claim 16 wherein a third key extends radially from the battery pack stem portion at a position circumferentially aligned with the first key such that the first and third keys are configured for axial passage through the first axial keyway and a fourth key extends radially from the battery pack stem portion at a position circumferentially aligned with the second key such that the second and fourth keys are configured for axial passage through the fourth axial keyway.

25. The battery pack attachment arrangement of claim 24 wherein the first and second keys are supported on the first support track and the third and fourth keys are supported on a second support track.

26. The battery pack attachment arrangement of claim 1 wherein the battery pack further comprises at least one circumferential latch configured to releasably secure the battery pack against rotation relative to the housing.

27. The battery pack attachment arrangement of claim 26 wherein the circumferential latch includes a latch body pivotally attached to the battery pack and moveable between a first position wherein a latch stop surface engages a housing stop surface and a second position wherein the latch stop surface is rotatably clear of the housing stop surface.

28. The battery pack attachment arrangement of claim 27 wherein the latch body is biased to the first position.

29. The battery pack attachment arrangement of claim 28 wherein a release button is configured to pivot the latch body two the second position.

* * * * *